United States Patent [19]
Shamoon et al.

[11] Patent Number: 5,867,609
[45] Date of Patent: *Feb. 2, 1999

[54] METHOD FOR COMPUTING CORRELATION OPERATIONS ON PARTIALLY OCCLUDED DATA

[75] Inventors: Talal Shamoon; Harold Stone, both of Princeton, N.J.

[73] Assignee: NEC Research Institute, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 568,771

[22] Filed: Dec. 7, 1995

[51] Int. Cl.$^6$ ........................................... G06K 9/64
[52] U.S. Cl. .............................. 382/278; 382/275
[58] Field of Search .................... 382/278, 218, 382/220, 274, 275, 217, 216

[56] References Cited

U.S. PATENT DOCUMENTS

| | | | |
|---|---|---|---|
| 4,776,023 | 10/1988 | Hamada et al. | 382/220 |
| 4,864,629 | 9/1989 | Deering | 382/216 |
| 5,150,429 | 9/1992 | Miller et al. | 382/275 |
| 5,479,537 | 12/1995 | Hamashima et al. | 382/218 |

*Primary Examiner*—Yon J. Couso
*Attorney, Agent, or Firm*—Arthur J. Torsiglieri; Jeffery J. Brosemer; Andrew G. Isztwan

[57] ABSTRACT

A method for finding a match between a pattern of data of relatively small size in a base of related data or relatively large size in the presence of occlusions which are gaps or noise that obscure portions, either of the pattern or of the base. The method involves masking out occluded points in both the base data and the pattern so that correlation can be computed only at those points that are not occluded.

27 Claims, 5 Drawing Sheets

METHOD FOR COMPUTING CORRELATION OPERATIONS ON PARTIALLY OCCLUDED DATA

FIELD OF THE INVENTION

This invention relates to a computer-implemented process for eliminating the effects of occlusions on the computation of correlation and correlation-related operations on pairs of sets of data (data sets).

BACKGROUND OF THE INVENTION

In a paper entitled "Image matching by means of intensity and texture matching in the Fourier domain" by H. S. Stone and C. S. Li that has been presented at the Conference in Image and Video Databases in San Jose, Calif. has been accepted in publication in the Proc. SPIE in January 1996, there is described a process for searching image data bases for images that match a specified pattern. The process has two thresholds that allow the user to adjust independently the closeness of the match. One threshold controls the closeness of the intensity match and the other controls the closeness of the texture match. The thresholds are correlations that can be computed efficiently in the Fourier transform domain of an image, and are especially efficient when the Fourier coefficients are mostly zero. This is especially important when used in conjunction with image-compression schemes that compress by setting small Fourier coefficients to zero.

However, the usefulness of this process is limited because in many practical cases of matching at least one of the images being matched is characterized by occlusions, defined as one or more sub-regions of the images at hand that are irrelevant to the computation of the correlation. Occlusions can arise from external noise (such as sensor noise) malfunction, or drop-outs in the data stream corresponding to the images, or transitory foreign objects in the visual or auditory scene under analysis. Occlusions cause (at times severe) distortion in correlation computations. This distortion arises from the evaluation of the correlation operation over all points in the data set, including the occlusions points. There is a need for a method that effectively removes the distortions caused by occlusions in the computation of the correlation by masking out the occluded points in both data sets being compared so that the correlation computation can be computed only at those points that are not occluded.

The present invention represents an improvement in the process described by essentially eliminating the effect of occlusions in the correlation operation.

SUMMARY OF THE INVENTION

The present invention utilizes a technique for masking out the effect of occlusions in the correlation computation so that the correlation computation is limited only to points that are not occluded in the operation used to compare two data sets such as two images.

A feature of our computation process is the introduction of an image mask vector for use with the candidate image and a pattern mask vector for use with the given pattern as discriminants to zero-out occluded locations, thereby allowing only those elements of the data sets representing valid data to enter into the computation to find correlations.

A related feature involves performing the matching on compressed forms of images and, to this end, the discriminants are employed in the frequency domain. In that domain, the images can be compressed by setting small coefficients to zero, thus reducing the cost of calculating the discriminants. Since the majority of operations can be done in the frequency domain with only the nonlinear thresholding operations performed in the pixel domain, the major cost of the computation is in the inverse Fourier transforms required to produce the pixel-domain representations of the discriminant functions.

It will be convenient to discuss the invention specifically with regard to visual images as the data sets to be correlated but the invention applies similarly to data sets of auditory information in which the occlusions can be the result of noise or gaps.

BRIEF DESCRIPTION OF THE DRAWING

The invention will be better understood from the following more detailed description taken in conjunction with the accompanying drawing in which.

DETAILED DESCRIPTION OF THE INVENTION

Figure 1:
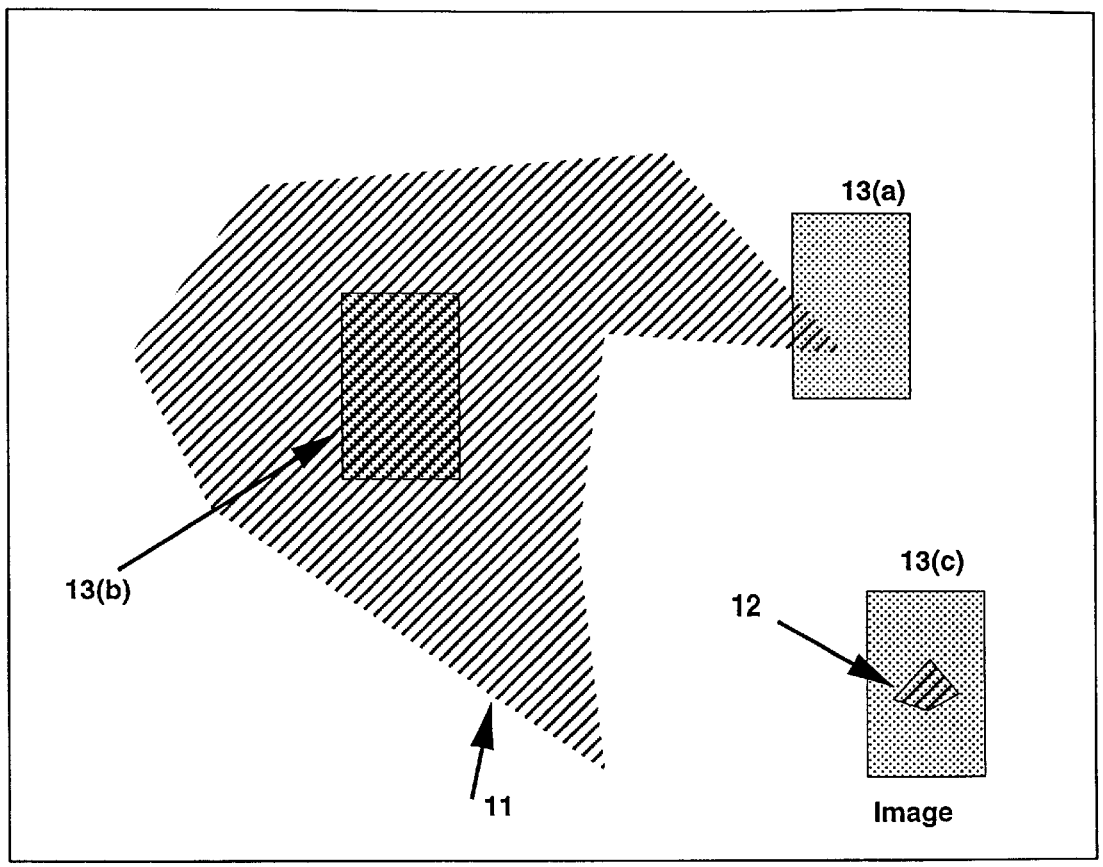
FIG. 1 is an image scene that includes occlusions and will be used to explain the influence of occlusions on the matching problem.

It will be helpful to begin with an expanded discussion of the aforementioned image-matching Stone-Li process on which the invention improves.

That process matches a limited size given pattern against equally-sized identically-oriented regions of a larger image, and applies two criteria in finding a match:

1. Intensity criterion: A particular region in the large image is a match candidate if its average intensity is close to the average intensity of the pattern;

2. Texture criterion: The quality of a match of the given pattern to the image in a particular relative position is determined by the Euclidean distance between the pattern and the images, the Euclidean distance being defined as the sum of squares of differences of the intensities of the pixels in the pattern and image.

If the Euclidean distance is smaller than a threshold, the pattern is declared to match the image at that position.

The intensity criterion serves as an "aperture" that enables or disables the texture criterion for each relative position of the pattern with respect to the image.

The sum of squares comparison is an instance of the well-known matched-filter technique for detecting signals in noise. The performance of this type of correlator is relatively sensitive to image noise. In the presence of image noise, the correlation function produces a relatively broad peak, thus making a selection of a correlation peak difficult. Moreover, it does poorly in discriminating between different instances of the same pattern that differ in their corresponding intensities. The introduction of the intensity criterion when used in conjunction with sum-of-squares provides much better discrimination. Because both criteria can be computed very efficiently in the Fourier frequency domain, especially when the nonzero Fourier coefficients are sparse, the pair of criteria used together usually provide a means for a fast content search.

The process performs the intensity and texture threshold calculations in the pixel domain where they require a few operations per pixel. Since the frequency domain operations on compressed images require an average of only a fraction of an operation per pixel, the main contributions to the cost of a search are the operations in the pixel domain, and the cost of transforming from the spatial-frequency domain to the pixel domain. The cost for transforming a compressed image into the pixel domain is generally less than the cost of transforming an uncompressed image, when a Fourier algorithm makes use of the sparsity of the transform data. Consequently, the dominant processing cost is likely to be the cost of the pixel domain operations required for thresholding.

In our improved process, we introduce modifications to the discriminants that were proposed by Stone-Li. In particular, our modifications to their basic approach eliminates obscured pixels from the discriminant calculations and make these calculations depend on unobscured pixels exclusively.

In the manner of Stone-Li, we let $x=(x_0, x_1, \ldots, x_{N-1})$ be an image vector, and $p=(P_0, P_1, \ldots, p_{M-1})$, $M \leq N$ be a pattern vector. The discriminants defined below are functions that measure the differences between the pattern and the image in two different ways. To measure the difference in textures in the manner characteristics of this art, we define the Euclidean distance between the image and the pattern at pixel position j with respect to the image to be S(j), the texture discriminant, at pixel position j. Mathematically, it is $$S(j) = \frac{1}{M} \sum_{i=0}^{M-1} (p_i - x_{i+j})^2, j = 0, \ldots, (N - M) \quad (1)$$

To measure differences of intensity, we define the difference in average intensities between the image and the pattern at pixel position j to be I(j). the intensity discriminant. Its definition is $$I(j) = \left| \frac{1}{M} \sum_{i=0}^{M-1} (p_i - x_{i+j}) \right|, j = 0, \ldots, (N - M) \quad (2)$$

The normalized forms of the discriminants are useful because they can be compared to thresholds that are independent of image and pattern size. The way the two discriminants are used in a search is discussed in the following section.

The intensity discriminant is similar to the L1 distance defined by the equation $$L1(j) = \frac{1}{M} \sum_{i=0}^{M-1} |(p_i - x_{i+j})|, j = 0, \ldots, (N - M)$$

with the main difference being the order of the linear and nonlinear operations. The reason for deferring the absolute value calculation in the intensity discriminant until after the summation is that the summation can be performed in the frequency domain on the transforms of the addends. Instead for the usual L1 metric, the nonlinear operation has to be performed in the pixel domain, which leads to a much higher cost in the present context. The quality of the search produced by the texture discriminant is roughly the same as that of the L1 metric, although the discriminants are not equal. Consequently, for searches that perform processing in the Fourier domain, the intensity discriminant is preferred to the L1 distance.

As Stone-Li have taught, one needs at least two discriminants to do effective searching. By using intensity in conjunction with texture, one can produce effective isolation of the matching regions of an image.

We now turn to the techniques used for dealing with occlusions that represent our improvements. We introduce two binary masks that identify respectively the occlusions in the given pattern and the occlusions in the candidate image. First we show the nature of the problem, which is that a small occlusion creates a potentially large perturbation in the discriminant functions. Then we show how mask functions can eliminate occluded pixels from the discriminant summations.

The problem caused by occlusions is illustrated by FIG. 1. The irregular polygons crosshatched in the figure represent large occlusions in the image, possibly caused by clouds, shadows, or data dropout. There is a large occlusion 11 in the center of the figure and a much smaller one 12 in the lower right. The figure shows three shaded rectangles 13(a), 13(b) and 13(c) that correspond to three positions of a given pattern that is being compared to the image. In Position 13(a), the pattern overlaps a very small portion of the large occlusion. The discriminants in this position will be contaminated, even if the overlap is small. The overlap will be especially bad for the texture discriminant because it computes the sums of squares of the pixel differences. In this position, if the pattern matched some feature of the unobscured image, the effect of the overlap of the occlusion may be so great as to drive one or both discriminants above the recognition threshold. For Position 13(a), it is obvious that we should exclude the occluded pixels from the discriminant calculations. Also, it is clear that any position of the pattern that overlaps an occlusion in the image is effected by the occlusion, and that the base algorithm has difficulty recognizing any unoccluded features that lie close to an occlusion.

In Position 13(b) the whole rectangular pattern is obscured by the occlusion. No pixel within the rectangle is visible. Hence, no algorithm can discover a match with the pattern located at this position.

Position 13(c) illustrates how large an impact an occlusion in an image can have on a query. In this case the occlusion is small compared to the pattern. Consider every position of a pattern that overlaps this occlusion. Every such position may suffer so greatly from the occlusion noise that the discriminants lie outside a search threshold that they satisfy otherwise. In one dimension, it is easy to see from Eq. (1) that an occlusion that obscures a pixel in position k contaminates all sums that contain index k, and these are positions that lie in the range $k-M+1 \leq j \leq k$. In two dimensions, a single obscured pixel contaminates to some extent all positions of a pattern that cover the pixel. The number of distinct positions of the pattern that are contaminated is equal to the number of pixels in the area of the rectangular region of the pattern.

Our basic idea in reducing the effects of occlusions is to perform the summations for the discriminants over the visible pixels, and to eliminate the terms that correspond to obscured pixels. We begin this analysis by applying this observation first to the texture discriminant S(j). The extension to the intensity discriminant I(j) will become obvious. Express S(j) as follows:

$$S(j) = \frac{1}{M(j)} \sum_{\substack{i \in V_{pattern} \\ i+j \in V_{image}}} (p_i - x_{i+j})^2, j = 0, \ldots, (N-M) \quad (3)$$

Here, $V_{pattern}$ and $V_{image}$ are the sets of all visible pixels for a pattern or image, respectively, where a pixel at position i is visible if it is not occluded. A term in Eq. (3) enters the summation only if both pattern pixel and the corresponding image pixel are visible.

The normalization factor $M(j)$ is a function of j in Eq. (3), whereas it is constant in Eq. (1). The normalizing factor counts the number of valid terms in the summation. In the absence of occlusions, it is constant for all positions j of the pattern with respect to the window. With occlusions present, it is equal to the number of terms for which both the pattern and image pixels are visible. When there are no terms in the summation for which both types of pixels are visible, $M(j)$ is undefined, and the search should take this point value to mean "no match". This is the case that arises for Position 13(b) in FIG. 1.

Now, to remove the offending pixels from the discriminant computation, we introduce two mask vectors—an N-vector m, the image mask, and an M-vector h, the pattern mask. The elements of both vectors are binary integers such that for $j = 0, \ldots, N-1$ and $i = 0, \ldots, M-1$:

$$m_j = \begin{cases} 0 & \text{if } x_j \text{ is occluded} \\ 1 & \text{if } x_j \text{ is visible} \end{cases} \quad (4)$$

and, $$h_i = \begin{cases} 0 & \text{if } p_i \text{ is occluded} \\ 1 & \text{if } p_i \text{ is visible} \end{cases} \quad (5)$$

Given these masks, we can express Eq. (3) as:

$$S(j) = \frac{1}{M(j)} \sum_{i=0}^{M-1} (p_i h_i m_{i+j} - x_{i+j} m_{i+j} h_i)^2, j = 0, \ldots, (N-M) \quad (6)$$

The expansion of this is:

$$S(j) = \frac{1}{M(j)} \sum_{i=0}^{M-1} (p_i^2 h_i^2 m_{i+j}^2 - 2p_i m_{i+j} x_{i+j} h_i + x_{i+j}^2 m_{i+j}^2 h_i^2), \quad (7)$$

$$j = 0, \ldots, (N-M)$$

To simplify Eq. (7) we define the masked image to be the N-vector $\hat{x}$ whose elements are $\hat{x}_i = x_i m_i$, $i = 0, \ldots, N-1$. Its elements have values equal to those of x where the pixels are visible and are equal to 0 otherwise. Similarly, we define the masked pattern $\hat{p}$ to be the analogous M-vector for the pattern. It has elements $\hat{p}_i = p_i h_i$, $i = 0 \ldots, M-1$.

Noting that the masks take on only the values 0 or 1, we can rewrite Eq. (7) as:

$$S(j) = \frac{1}{M(j)} \sum_{i=0}^{M-1} (\hat{p}_i^2 m_{i+j} - 2\hat{p}_i \hat{x}_{i+j} + \hat{x}_{i+j}^2 h_i), j = 0, \ldots, (N-M) \quad (8)$$

Since the circular correlation between an M-vector p and an N-vector x is defined as $$(x * p)_j = \sum_{i \in M} x_{(j+i) \bmod N} p_i. \quad (9)$$

Using Eq. (9) in Eq. (8) we obtain $$S(j) = \frac{1}{(m * h)_j} (\hat{p}^{(2)} * m - (2\hat{x} * \hat{p}) + \hat{x}^{(2)} * h)_j, \quad (10)$$

$$j = 0, \ldots, (N-M)$$

where $\hat{p}^{(2)} = (\hat{p}_0^2, \hat{p}_1^2, \ldots, \hat{p}_{M-1}^2)$. Hence, the texture discriminant requires the calculation of four correlations.

Figure 2A:
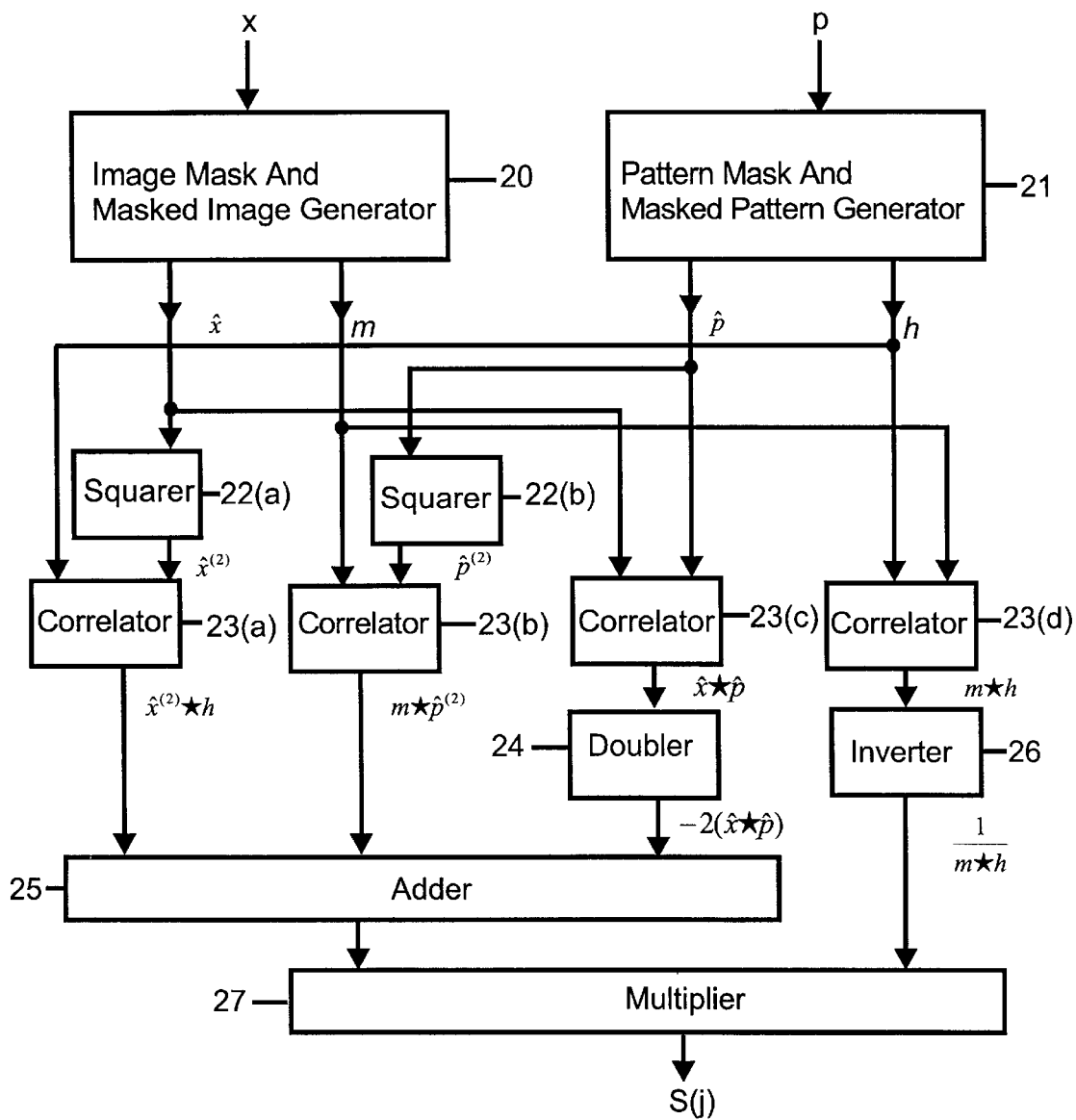
FIG. 2A is a block diagram illustrating an apparatus for calculating a texture discriminant $S(j)$ in accordance with the present invention.
Figure 2B:
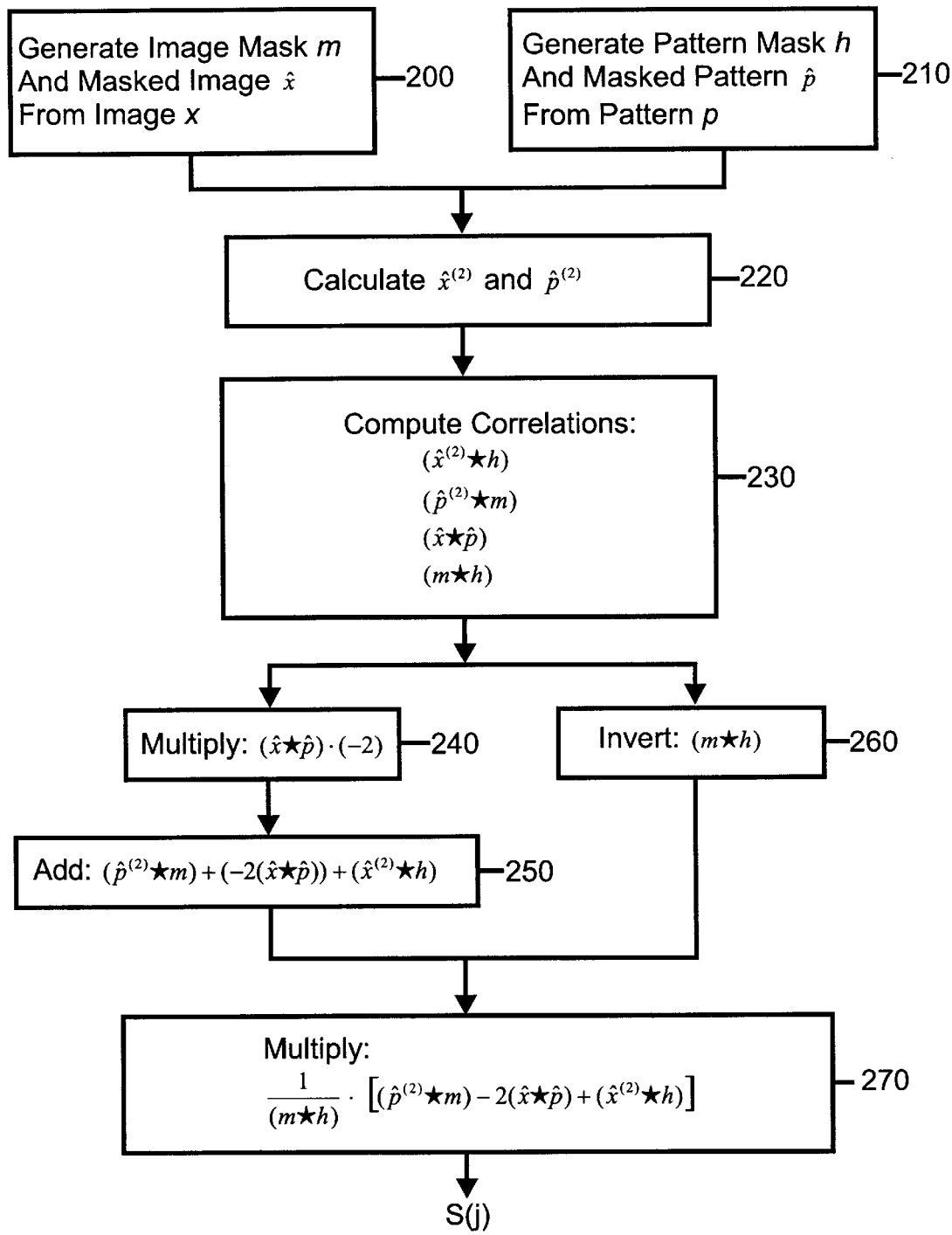
FIG. 2B is a flow diagram illustrating a method for calculating a texture discriminant $S(j)$ in accordance with the present invention.

FIGS. 2A and 2B illustrate the computation of $S(j)$. FIG. 2A is a block diagram depicting an apparatus for calculating $S(j)$, while FIG. 2B is a flow diagram depicting a method for carrying out the computation of $S(j)$. Calculating $S(j)$ begins with a step 200 in which pixel values for an image mask m and a masked image $\hat{x}$ are generated with a generator 20, using the pixel values of image x as an input. Similarly, in a step 210, pixel values for a pattern mask h and a masked pattern $\hat{p}$ are generated with a generator 21, using the pixel values of pattern p as an input. Next, the masked image $\hat{x}$ and masked pattern $\hat{p}$ are squared by squarers 22(a) and 22(b) in a step 220 to produce squared masked image $\hat{x}^{(2)}$ and squared masked pattern $\hat{p}^{(2)}$, respectively. Four correlations are then computed in a correlating step 230 using four correlators 23(a)–23(d). Specifically, correlator 23(a) computes the correlation between squared masked image $\hat{x}^{(2)}$ and pattern mask h; correlator 23(b) computes the correlation between image mask m and squared masked pattern $\hat{p}^{(2)}$; correlator 23(c) computes the correlation between masked image $\hat{x}$ and masked pattern $\hat{p}$; and correlator 23(d) computes the correlation between image mask m and pattern mask h. The computed correlation between masked image $\hat{x}$ and masked pattern $\hat{p}$ output by correlator 23(c) is then multiplied by negative two (−2) in a step 240 using a doubler 24, and the outputs of correlators 23(a) and 23(b) and of the doubler 24 are added together in a summing step 250 using adder 25. Meanwhile, in a step 260, the inverse of the computed correlation between the image mask m and the pattern mask h output by correlator 23(d) is obtained by an inverter 26. Finally, the outputs of the adder 25 and the inverter 26 are multiplied together in a step 270 using a multiplier 27 to produce a final calculation of $S(j)$.

While the computations of FIGS. 2A and 2B typically would be performed by a suitably programmed general purpose computer, these computations may also be performed in hardware.

A similar analysis holds for the intensity discriminant. We expand Eq. (2) into the form, $$I(j) = \left| \frac{1}{M(j)} \sum_{i=0}^{M-1} (\hat{p}_i m_{i+j} - \hat{x}_{i+j} h_i) \right|, j = 0, \ldots, (N-M), \quad (11)$$

from which follows $$I(j) = \frac{1}{(m * h)_j} |m * \hat{p} - \hat{x} * h|_j, j = 0, \ldots, (N-M). \quad (12)$$

Figure 3A:
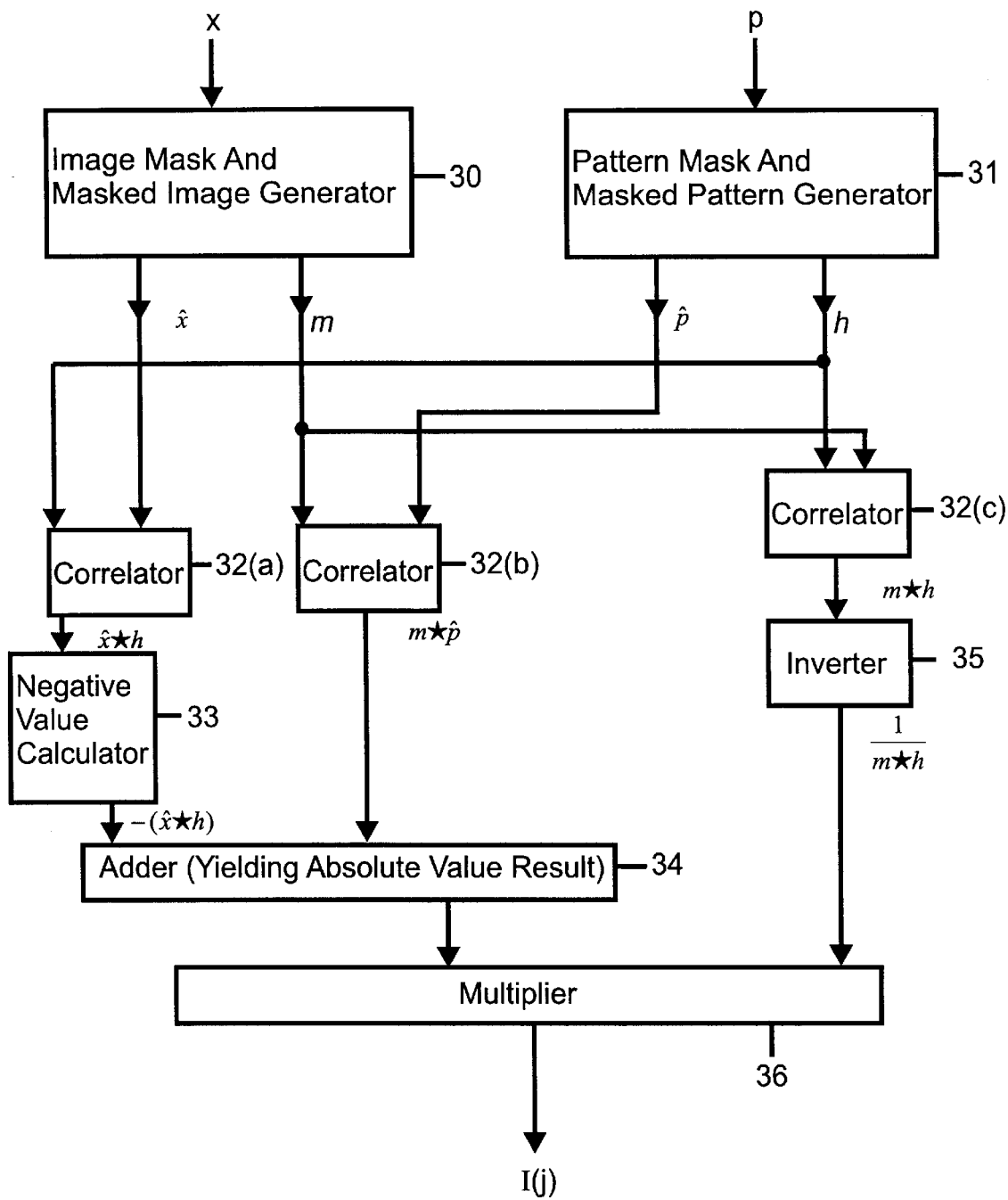
FIG. 3A is a block diagram illustrating an apparatus for calculating an intensity discriminant $I(j)$ in accordance with the present invention.
Figure 3B:
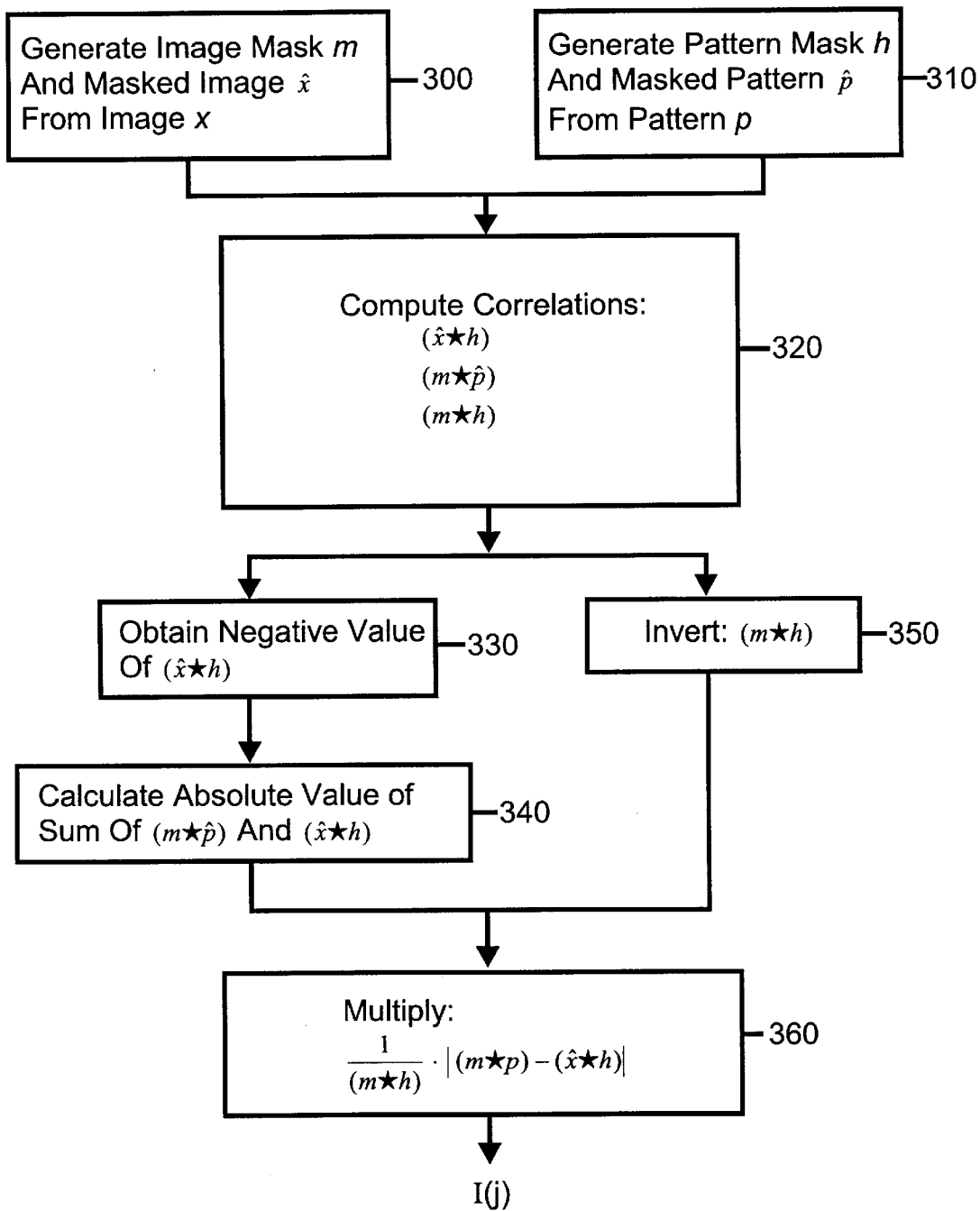
FIG. 3B is a flow diagram illustrating a method for calculating an intensity discriminant $I(j)$ in accordance with the present invention.

FIGS. 3A and 3B illustrate the computation of $I(j)$. FIG. 3A is a block diagram depicting an apparatus for calculating $I(j)$, while FIG. 3B is a flow diagram depicting a method for carrying out the computation of $I(j)$. Calculating $I(j)$ begins with a step 300 in which pixel values for an image mask m and a masked image $\hat{x}$ are generated with a generator 30, using the pixel values of image x as an input. Similarly, in a step 310, pixel values for a pattern mask h and a masked pattern $\hat{p}$ are generated with a generator 31, using the pixel values of pattern p as an input. Thereafter, three correlations are computed in a correlating step 320 using three correlators 32(a)–32(c). Specifically, correlator 32(a) computes the correlation between masked image $\hat{x}$ and pattern mask h;

correlator 32(b) computes the correlation between image mask m and masked pattern $\hat{p}$; and correlator 32(c) computes the correlation between image mask m and pattern mask h. Next, in a step 330, the negative value of the computed correlation between masked image $\hat{x}$ and pattern mask h output by correlator 32(a) is computed using negative value calculator 33. In a step 340, the outputs of negative value calculator 33 and correlator 32(b) are added together and the absolute value of this sum is obtained using adder 34. Meanwhile, in a step 350, the inverse of the computed correlation between the image mask m and the pattern mask h output by correlator 32(c) is obtained by an inverter 35. Finally, the outputs of the adder 34 and the inverter 35 are multiplied together in a step 360 using a multiplier 36 to produce a final calculation of I(j).

While the computations of FIGS. 3A and 3B typically would be performed by a suitably programmed general purpose computer, these computations may also be performed in hardware.

The discriminants described by Stone-Li fall out as a special case of Eqs. (10) and (12). To obtain their equations, replace the pattern mask h by an all 1s M-vector and the image mask m by an all 1s N-vector in the above equations. The first terms of Eqns. (10) and (12) reduce to constants, and the normalizing factor becomes the constant M for both equations.

Both discriminants depend on correlations, and the correlations can be evaluated in the Fourier domain instead of in the pixel domain. Let x and y be N-vectors, and let X and Y be their Fourier transforms. The Convolution Theorem for circular correlations described in a book by R. E. Blahut entitled *Fast Algorithms for Digital Signal Processing* (Reading, Mass.: Addison Wesley, 1985) states that $$F(x^*y)_j = (X)_j (Y^*)_j, \quad (13)$$

where F denotes the Fourier transform matrix, and Y * is the complex conjugate of Y. Hence, we can evaluate the correlations of Eqs. (10) and (12) in the Fourier domain, provided the vector lengths are compatible. In those equations, the correlations are all between an M-vector and an N-vector, whereas the Convolution Theorem as stated above requires the vectors to be of the same length. Consequent, we need to create N-vectors from the pattern and pattern mask M-vectors p and h. We do this by, if this is possible, padding each of these vectors with N–M 0s.

The primary reason for performing the calculations in the Fourier domain is to reduce the cost of computation. A correlation in the pixel domain requires approximately 2 MN operations, but the point-wise multiplication in the Fourier domain requires only N operations, plus the cost of the transforms. For images with N pixels, whether they be arranged in 1 or 2 dimensions, the transform cost is O (N log N). Consequently, the computation cost for an algorithm based on spatial frequency calculations is dominated by the cost of performing transforms into and out of the frequency domain. For values of log N small compared to M, frequency-domain correlations are less costly than pixel-domain correlations.

To take full advantage of this cost savings, the process originally described by Stone-Li becomes the following when the occlusion-reduction masks are introduced in accordance with our invention:

1. In the database, store the masked image $\hat{x}$, the masked image with pixels squared $\hat{x}^{(2)}$ and the image mask m in their Fourier representations in compressed form.
2. For a query with pattern p, create compressed Fourier representations for the masked pattern $\hat{p}$ and the pattern mask h.
3. Using compressed Fourier representations, compute the normalization factor, and the unnormalized forms of the intensity and texture discriminants.
4. Take the inverse transforms of the normalization factor and discriminants, and normalize the discriminants in the pixel domain.
5. Do thresholds and other nonlinear operations on the discriminants in the pixel domain to complete the query processing.

The cost of a query is mainly in the last three steps because the first step is done as images enter the database, and the second step is done only once per image size for a query rather than one per image for that query. Compression greatly reduces the cost of the third step (the point-wise multiplications) because operations are performed only on the terms for which both multiplier and multiplicand are nonzero. Compression produces some reduction on the inverse transform step because the zero coefficients need not participate in the computation. However, the reduction depends on the sparsity of the nonzero coefficients in the transforms and on the distribution of those nonzeros, so that the speedup achievable may be limited. Each inverse transform requires roughly 50 to 100 operations per pixel for uncompressed images of sizes in the range of 128×128 to 1024×1024 pixels. The last step typically involves a few nonlinear operations per pixel in the pixel domain, and does not carry a significant computational cost.

To compare the computational costs of the base algorithm described by Stone and Li to the generalization, consider each of the steps above. For input data, the base algorithm requires four distinct transforms—those of p, x, $x^{(2)}$, and h. The enhancement requires six distinct transforms—the transforms of $\hat{p}$, $\hat{x}$, $\hat{x}^{(2)}$, h, $\hat{p}^{(2)}$, and m. Since the transforms of image-related data are precomputed and stored as part of the database, they (to not add to the computational cost of a query. The transforms related to a pattern are applied to many images without being recomputed for each image query, so that they do not add significantly to the number of operations required per image pixel. The base algorithm requires three correlations—$x^*p$, $x^{(2)}*h$, and $x^*h$, —and the enhanced algorithm requires six—the masked versions of those required for the base algorithm plus $m^*\hat{p}$, $m^*\hat{p}^{(2)}$, and $h^*m$. All of these factors lead to negligible differences in computation time since they account for only a few operations per pixel per image.

The main difference in computation time is due to the inverse Fourier transform. The base algorithm requires the transform of the intensity and texture discriminants, whereas the enhanced algorithm must transform unnormalized intensity and texture discriminants as well as their normalizing factor. This will increase processing time by about 50 percent over the base algorithm.

To obtain significant speedup, it is advantageous to reduce the cost of the inverse transforms in some fashion. Recall that for small values of M, that is, for patterns with a very small pixel area, it may be faster to do all operations in the pixel domain, in which case, Fourier techniques are not especially attractive.

It is to be understood that the particular embodiment described in which the problem is to find a visual match between a relatively small pattern and a portion of a relatively larger image in the presence of occlusions is merely illustrative of the general principles of the invention. The same principles should be applicable where the problem is to find an auditory match in the presence of noise between relatively short pattern of sound and a relatively long sound track.

For matching sound from an information base of sounds with a short pattern of sound, in both instances one will convert the sound pulses to by sampling, advantageously at the Nyquist interval, and the samples would be quantized and coded to binary bits. Thereafter, when both the base information and the pattern have been so invented, one can proceed in the same manner as described for matching of images. The effect of occlusions in the sound would be treated in the same manner as occlusions in the case of images.

What is claimed is:

1. A method for determining whether regions of an image match a predetermined pattern, wherein the image may contain occlusions and the pattern may contain occlusions, the method comprising the steps of:

generating an image mask which represents the occlusions in the image;

generating a pattern mask which represents the occlusions in the pattern;

providing a first discriminant for computing whether an image region matches the pattern, wherein the first discriminant incorporates both the image mask and the pattern mask so as to remove any occlusions in both the image and the pattern from the computation of the first discriminant;

computing the value of the first discriminant for each image region; and comparing the computed value of the first discriminant for each image region with a first predetermined threshold to determine whether each image region matches the pattern.

2. The method of claim 1, wherein the image mask and pattern mask are binary masks.

3. The method of claim 2, wherein the image mask comprises a vector of image mask elements, each image mask element being a binary integer representing whether a corresponding pixel in the image is occluded or not occluded, and wherein the pattern mask comprises a vector of pattern mask elements, each pattern mask element being a binary integer representing whether a corresponding pixel in the pattern is occluded or not occluded.

4. The method of claim 1, wherein the step of computing the first discriminant further comprises evaluating at least one correlation.

5. The method of claim 4, wherein the at least one correlation is evaluated in the Fourier domain, and wherein the comparing step is performed in the pixel domain.

6. The method of claim 1, wherein the first discriminant is an intensity discriminant.

7. The method of claim 6, wherein the image region is determined to match the pattern if the computed value of the intensity discriminant is less than the first predetermined threshold.

8. The method of claim 6, wherein the image is represented as a vector of pixels $x=(x_0, x_1, \ldots, x_{N-1})$ and the pattern is represented as a vector of pixels $p=(p_0, p_1, \ldots, p_{M-1})$, $M \leq N$, and wherein the image mask is represented as a vector m comprising N binary integers and the pattern mask is represented as a vector h comprising M binary integers, such that for a pixel position $j=0, \ldots, N-1$ and $i=0, \ldots, M-1$:

$$m_j = \begin{cases} 0 & \text{if } x_j \text{ is occluded} \\ 1 & \text{if } x_j \text{ is not occluded} \end{cases}$$

and $$h_i = \begin{cases} 0 & \text{if } p_i \text{ is occluded} \\ 1 & \text{if } p_i \text{ is not occluded} \end{cases}$$

and wherein the intensity discriminant, $I(j)$, at pixel position j, is:

$$I(j) = \frac{1}{(m*h)_j} |m*\hat{p} - \hat{x}*h|_j, j = 0, \ldots, (N-M).$$

9. The method of claim 8, wherein the correlations performed in the step of computing the value of the intensity discriminant are evaluated in the Fourier domain, and wherein the comparing step is performed in the pixel domain.

10. The method of claim 1, wherein the first discriminant is a texture discriminant.

11. The method of claim 10, wherein the image region is determined to match the pattern if the computed value of the texture discriminant is less than the first predetermined threshold.

12. The method of claim 10, wherein the image is represented as a vector of pixels $x=(x_0, x_1, \ldots, x_{N-1})$ and the pattern is represented as a vector of pixels $p=(P_0, p_1, \ldots, p_{M-1})$, $M \leq N$, and wherein the image mask is represented as a vector m comprising N binary integers and the pattern mask is represented as a vector h comprising M binary integers, such that for a pixel position $j=0, \ldots, N-1$ and $i=0, \ldots, M-1$:

$$m_j = \begin{cases} 0 & \text{if } x_j \text{ is occluded} \\ 1 & \text{if } x_j \text{ is not occluded} \end{cases}$$

and $$h_i = \begin{cases} 0 & \text{if } p_i \text{ is occluded} \\ 1 & \text{if } p_i \text{ is not occluded} \end{cases}$$

and wherein the texture discriminant, $S(j)$, at pixel position j, is:

$$S(j) = \frac{1}{(m*h)_j} (\hat{p}^{(2)}*m - 2(\hat{x}*\hat{p}) + \hat{x}^{(2)}*h)_j, j = 0, \ldots, (N-M).$$

13. The method of claim 12, wherein the correlations performed in the step of computing the value of the texture discriminant are evaluated in the Fourier domain, and wherein the comparing step is performed in the pixel domain.

14. The method of claim 1, wherein the image is a visual image and the pattern is a visual pattern, and wherein the occlusions prevent portions of the image or pattern from being visible.

15. The method of claim 1, wherein the image is a sound image and the pattern is a sound pattern, and wherein the occlusions are noise which prevent portions of the image or pattern from being hearable.

16. A method for determining whether regions of an image match a predetermined pattern, wherein the image may contain occlusions and the pattern may contain occlusions, the method comprising the steps of:

generating an image mask which represents the occlusions in the image;

generating a pattern mask which represents the occlusions in the pattern;

providing a first discriminant for computing whether an image region matches the pattern, wherein the first discriminant incorporates both the image mask and the pattern mask so as to remove any occlusions in both the image and the pattern from the computation of the first discriminant;

computing the value of the first discriminant for each image region;

providing a second discriminant for computing whether an image region matches the pattern, wherein the second discriminant incorporates both the image mask and the pattern mask so as to remove any occlusions in both the image and the pattern from the computation of the second discriminant;

computing the value of the second discriminant for each image region; and comparing the computed value of the first discriminant for each image region with a first predetermined threshold and comparing the computed value of the second discriminant for each image region with a second predetermined threshold to determine whether each image region matches the pattern.

17. The method of claim 16, wherein the image mask and pattern mask are binary masks.

18. The method of claim 17, wherein the image mask comprises a vector of image mask elements, each image mask element being a binary integer representing whether a corresponding pixel in the image is occluded or not occluded, and wherein the pattern mask comprises a vector of pattern mask elements, each pattern mask element being a binary integer representing whether a corresponding pixel in the pattern is occluded or not occluded.

19. The method of claim 16, wherein the step of computing the first discriminant further comprises evaluating at least one correlation, and wherein the step of computing the second discriminant further comprises evaluating at least one correlation.

20. The method of claim 19, wherein the correlations are evaluated in the Fourier domain, and wherein the comparing step is performed in the pixel domain.

21. The method of claim 16, wherein the first discriminant is an intensity discriminant and the second discriminant is a texture discriminant.

22. The method of claim 21, wherein the image region is determined to match the pattern if the computed value of the intensity discriminant is less than the first predetermined threshold and the computed value of the texture discriminant is less than the second predetermined threshold.

23. The method of claim 22, wherein the image is represented as a vector of pixels $x=(x_0, x_1, \ldots, x_{N-1})$ and the pattern is represented as a vector of pixels $p=(p_0, p_1, \ldots, p_{M-1})$, $M \leq N$, and wherein the image mask is represented as a vector $m$ comprising $N$ binary integers and the pattern mask is represented as a vector $h$ comprising $M$ binary integers, such that for a pixel position $j=0, \ldots, N-1$ and $i=0, \ldots, M-1$:

$$m_j = \begin{cases} 0 & \text{if } x_j \text{ is occluded} \\ 1 & \text{if } x_j \text{ is not occluded} \end{cases}$$

and $$h_i = \begin{cases} 0 & \text{if } p_i \text{ is occluded} \\ 1 & \text{if } p_i \text{ is not occluded} \end{cases}$$

and wherein the intensity discriminant, $I(j)$, at pixel position $j$, is:

$$I(j) = \frac{1}{(m*h)_j} |m * \hat{p} - \hat{x} * h|_j, j=0, \ldots, (N-M)$$

and wherein the texture discriminant, $S(j)$, at pixel position $j$, is:

$$S(j) = \frac{1}{(m*h)_j} (\hat{p}^{(2)} * m - 2(\hat{x}*\hat{p}) + \hat{x}^{(2)} * h)_j, j=0, \ldots, (N-M).$$

24. The method of claim 22, wherein the correlations performed in the steps of computing the values of the intensity discriminant and the texture discriminant are evaluated in the Fourier domain, and wherein the comparing step is performed in the pixel domain.

25. The method of claim 16, wherein the image is a visual image and the pattern is a visual pattern, and wherein the occlusions prevent portions of the image or pattern from being visible.

26. The method of claim 16, wherein the image is a sound image and the pattern is a sound pattern, and wherein the occlusions are noise which prevent portions of the image or pattern from being hearable.

27. The method of claim 16, wherein the second discriminant is computed only if the comparison of the computed value of the first discriminant with the first predetermined threshold indicates that the image region may match the pattern.

* * * * *